Dec. 5, 1961  F. CLARK  3,011,768
AUTOMATIC STIRRING DEVICE
Filed March 13, 1959  2 Sheets-Sheet 1
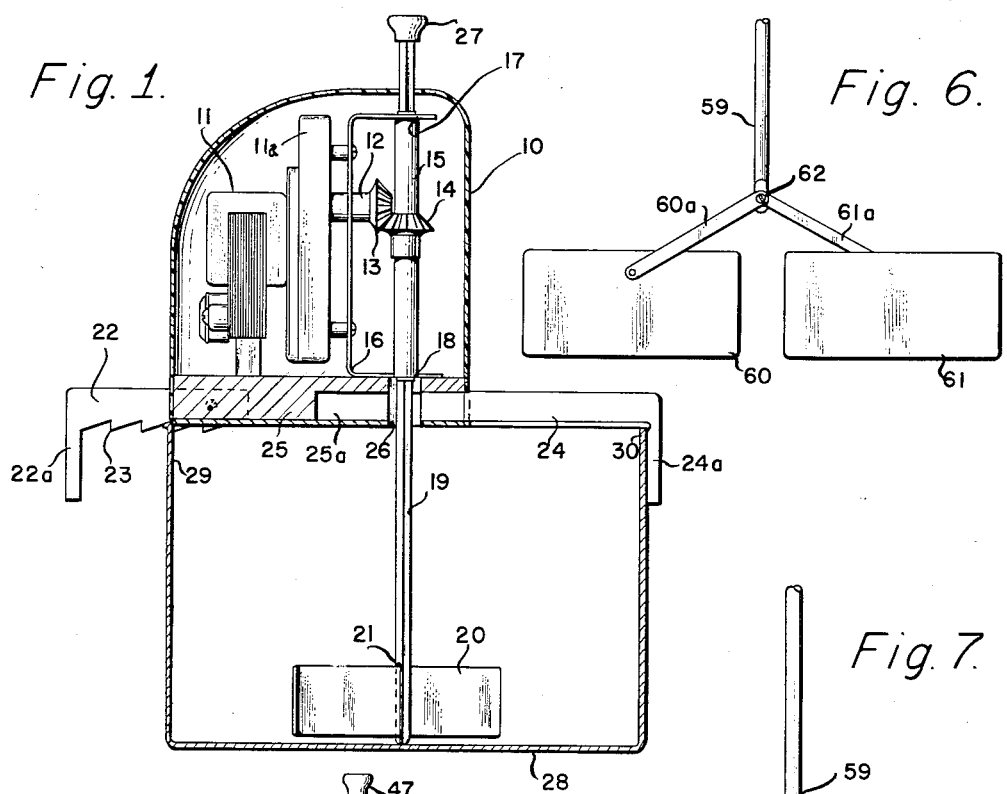
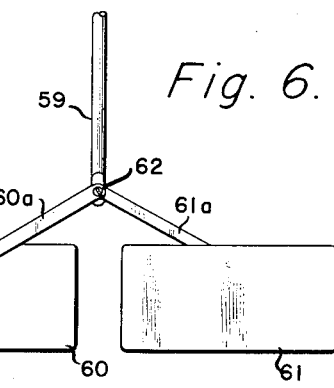
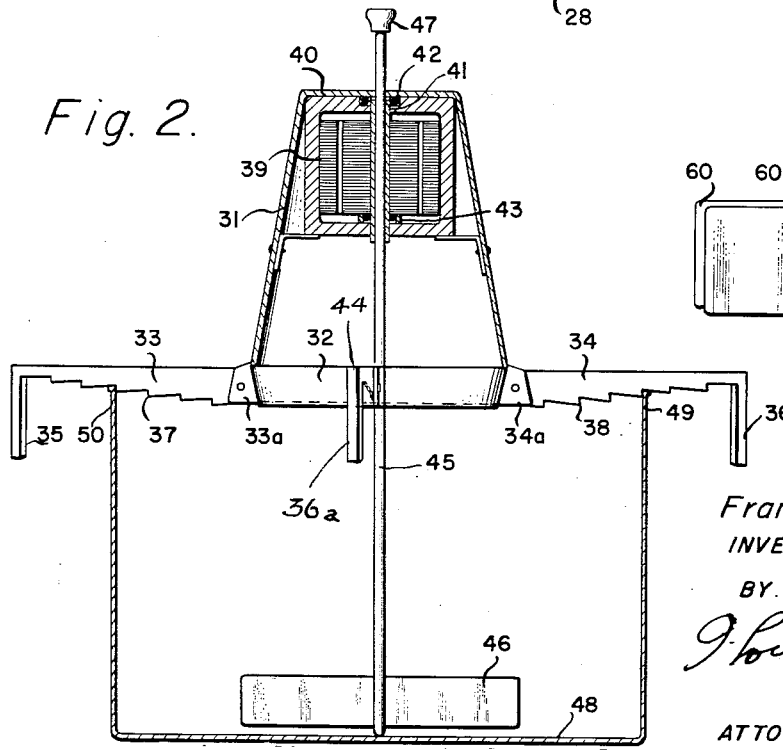
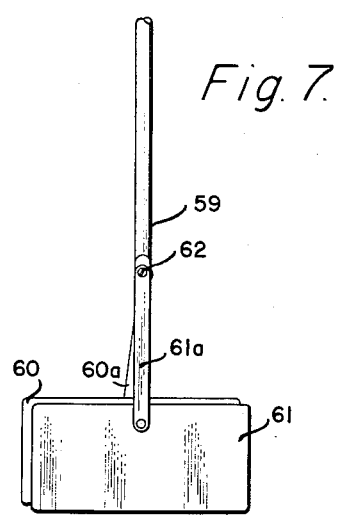
Frank Clark,
INVENTOR.
BY.
ATTORNEY.

Dec. 5, 1961 F. CLARK 3,011,768
AUTOMATIC STIRRING DEVICE
Filed March 13, 1959 2 Sheets-Sheet 2
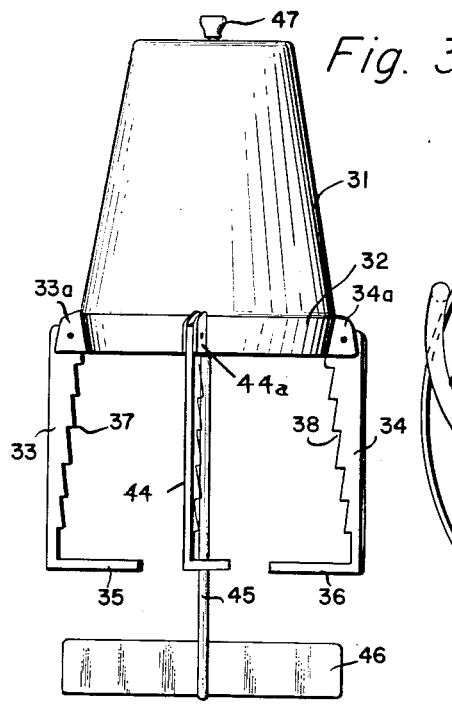
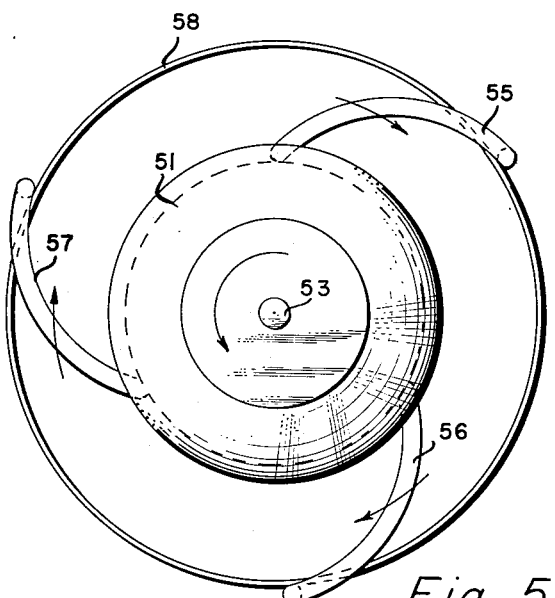
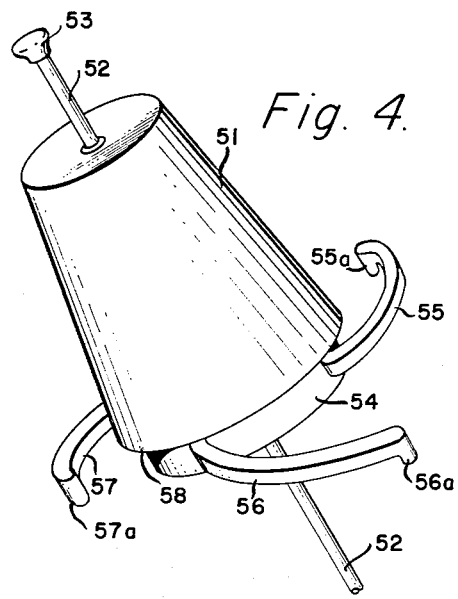
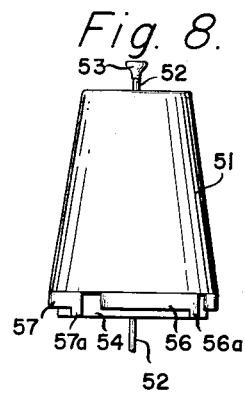
Frank Clark,
INVENTOR.
BY.
ATTORNEY.

United States Patent Office 3,011,768
Patented Dec. 5, 1961

3,011,768
AUTOMATIC STIRRING DEVICE
Frank Clark, Santa Monica, Calif.
(1725 Federal Ave., West Los Angeles, Calif.)
Filed Mar. 13, 1959, Ser. No. 799,210
5 Claims. (Cl. 259—108)

The present invention relates to kitchen appliances, and more particularly to improved automatic stirring devices for use in heating or cooking foods.

In the heating or cooking of foods, it is frequently desirable or necessary to stir the food constantly to prevent burning, sticking to the pan, to effect proper blending or to prevent boiling over of liquids. Usually it is necessary to perform this task manually, which is a tedious job, requiring the expenditure of a wasteful amount of time and effort. Furthermore, manual stirring cannot be as constant and uniform as that which is performed mechanically.

In order to achieve these results while allowing the cook to devote his or her attention to other pursuits, applicant has provided an automatic stirring device which can be positioned on a pan or a pot to effect such stirring through motor driven means which can operate continuously without attention.

It is therefore an object of the present invention to provide an automatic stirring device which is attachable to or can be positioned on, receptacles, pots or pans of various diameters and which includes a rotary stirring device adapted to be operated by an electric motor or other power means.

It is a further object of the present invention to provide an automatic stirring device of the type described in which the stirrer member is self-adjusting in length to adapt itself automatically to any depth of receptacle.

It is a still further object of the present invention to provide an automatic stirring device of the type described in which the stirring means include blades the position of which is adjustable to permit stirring action to take place at the center or adjacent to the edges of the receptacle or both.

It is an additional object of the present invention to provide an automatic stirring device of the type described, in which the stirring member is readily removable for cleaning purposes.

It is a still further object of the present invention to provide an automatic stirring device of the type described comprising novel supporting means adapted to position the device between the edges of the pan or receptacle said means being adjustable to permit use with receptacles of various dimensions.

Other objects will become apparent from a consideration of the following specification and attached drawings wherein, FIGURE 1 is a view partly in cross section and partly in elevation illustrating one form of the device positioned on a receptacle.

FIG. 2 is a view partly in cross section and partly in elevation illustrating a modified form of the device positioned on a receptacle.

FIG. 3 is a view in elevation illustrating the device of FIG. 2 in a collapsed or storage position.

FIG. 4 is a view in elevation of another form of the invention.

FIG. 5 is a top plan view illustrating the device of FIG. 4 positioned on a receptacle.

FIG. 6 is a view in elevation illustrating one form of agitating member utilized in the device.

FIG. 7 is a view in elevation showing the stirring device of FIG. 4 in a relaxed position.

FIG. 8 is a view in elevation showing the device of FIGS. 4 and 5 with the supporting arms in retracted position.

As shown in FIG. 1 of the drawing, the numeral 10 designates a housing containing an electric motor unit 11. Shaft 12 which is driven by the motor through a reduction gear box 11a is provided at its end with a pinion gear 13 which engages a corresponding pinion gear 14 which is mounted upon hollow sleeve 15 which is rotatably mounted upon bearing surfaces 17 and 18 provided by openings formed in bracket member 16 which also serves to support the motor. The interior of sleeve 15 is rectangular or at least irregular in cross section in order that it will provide rotational engagement to shaft member 19 which is also of rectangular or irregular cross section and is freely slidable up and down within said sleeve. The lower end of the shaft is provided with a stirring blade 20 which is frictionally inserted within slot 21 formed in the end of the shaft. This permits lateral adjustment of the blade so that it can have a greater or lesser horizontal sweep adjacent to the bottom of the receptacle. The motor housing 10 is positioned on a base member 25 to which is affixed a pair of outwardly extending arms 22 and 24. As illustrated, arm 22 is provided with a downwardly depending end portion 22a and an irregular bottom surface which may comprise serrations or similar portions 23 suitable for firmly engaging the edge of a receptacle in engagement therewith. Arm 22 may be bolted or riveted in fixed position at the base, but if desired may be laterally adjustable by sliding engagement therewith. Arm 24 is provided with a downwardly depending member 24a and is horizontally or laterally slidable to enlarge the space between 22a and 24a to permit engagement with receptacles of different diameters. This is accomplished by providing a slot or other opening 25a in base 25 into which arm 24 may be slidably moved. The base is provided with an opening 26 through which shaft 19 depends. Since shaft member 19 is freely slidable vertically within sleeve 15, it will tend to drop down until it engages the bottom surface of the receptacle 28 thereby automatically seeking the bottom of the pan, the unit being supported along the upper edge portions of the receptacle as shown at 29 and 30. In order to permit the shaft member from dropping from the sleeve its upper end is provided with cap or plug member 27 which is affixed by threading or frictional engagement therewith. On the other hand when it is desired to remove the shaft and blade for cleaning purposes cap 27 is removed and the shaft and stirring blade readily removed for this purpose by withdrawing it from the sleeve.

In use, the device is positioned on a receptacle containing the food to be stirred by first drawing arm 24 out to the proper position so that the unit will be positioned over the receptacle with its upper side edges in engagement with arms 22 and 24 while at the same time the position of the shaft will be in the desired concentric relationship with the receptacle. The shaft automatically drops down until it engages the bottom of the pan and at this point the motor may be turned on and the unit will remain in position and continue stirring until the motor is shut off. The motor may be of a suitable low velocity type and gearing arrangement may be such that the shaft operates at a suitable low velocity down as low as a few r.p.m.'s. If desired, conventional motors of fairly high r.p.m. may be used and reduction gearing utilized to reduce the speed of the stirrer to the desired level, as illustrated.

In the modified form of the invention illustrated in FIG. 2, housing 31 is provided with a base flange member 32 to which arms 33, 34 and 44 are pivotally united by means of hinge portions 33a, 34a and 44a. Each arm is provided with corresponding downwardly extending members 35, 36 and 36a and with serrations or offset portions 37 and 38 adapted to engage the edges of a receptacle such as a pot or a pan as shown at 49 and 50. The housing encloses a motor 39 which is provided with a shaft 40 which has a longitudinally extending hollow bore 41 preferably of rectangular or irregular cross section. The shaft rotates within bearings 42 and 43. An elongated shaft 45 is slidably positioned within a hollow shaft 40 of the motor. The shaft has a cross section corresponding to that of the shaft. At the lower end of the shaft is positioned stirring blade 46 which is inserted through a slot at the bottom of the shaft. The upper end of the shaft is retained against falling out during handling of the unit by means of a cap member 47 which is threaded or frictionally applied to the other end of the shaft. As shown in FIG. 3, when the unit is not in use, arms 33, 34 and 44 normally depend downward thus saving space for storage and otherwise. When in use the arms are lifted to horizontal position and the unit then placed over the edges of a receptacle with the serrations or stepped portions such as 27 and 38 in suitable contact with the edges, thereby restraining the unit against the lateral movement. At the same time the shaft will seek the level of the bottom of the pan in view of the fact that it is not restrained and is freely slidable within the shaft to the motor. Preferably the motor is of a suitably low r.p.m. in which case the drive is directly from the shaft of the motor to the shaft of the stirrer. Otherwise the motor shaft may be driven through a planetary reducing gear in order that a suitably low rate of movement will be imparted to the stirring means.

Still another modified form of the invention is illustrated in FIGS. 4, 5 and 8. Housing 51 encloses a motor having a hollow shaft such as illustrated in FIGS. 2 and 3. Slidably positioned within the shaft is stirring shaft 52 which is restrained against dropping out of the assembly by means of a cap member 53. The housing is provided with a base member 54 having pivotally attached thereto a plurality of arms 55, 56 and 57. Each of these arms is pivotally attached to the base at one end and is designed to extend outwardly at a suitable angle or to be drawn against the base of the housing when not in use As illustrated since the housing itself is circular in cross section the arms are formed as curved members which are substantially the segments of a circle corresponding to the circumference of the base of the housing, in order that when in retracted position, the arms will nest against the base for convenience in storage and result in obvious space saving advantages. In order that the arms may be retracted in a manner which will provide the most convenient arrangement and the most pleasing surface appearance, the housing and base are so designed that a shoulder or recessed area will be provided as shown at 58. At the same time the length of the arms is such that it represents a proportionate segment of the circumference of the base so that if for example there are three arms, each arm will have a length no greater than and preferably slightly less than one third of the circumference of the base. In this way the arms when in fully retracted position, as shown in FIG. 8, will present a smooth contour. When in use the arms are drawn outward as shown in FIG. 5 and placed in position over the edge of a receptacle with depending projections at the end of the arms 55a, 56a and 57a in engagement over the outside edge. When the motor is in operation and the stirring shaft rotating, the torque thereby created will tend to draw the arms into engagement with the edges of the receptacle as shown by the arrows in FIG. 5.

Of course, if desired, the shape of the housing may be rectangular or otherwise, in which case the arms may also conform to the contours of the housing. If the housing is square, for example, each arm may be linear instead of curved.

A modified form of stirring member is illustrated in FIGS. 6 and 7. This member is designed to have two laterally adjustable members which swing outwardly during use and thus adapt themselves automatically to different diameters of receptacles. The member consists of shaft 59, blades 60 and 61, and arms 60a and 61a pivotally connecting the blades to the shaft. In stationary position, the blades hang down as shown in FIG. 7. When in use the blades engage the bottom of the pan and are forced outward by pressure as well as by centrifugal force during rotation.

It will be understood that various changes and modifications may be made in the device as described without departing from the spirit and scope of the invention.

I claim:
1. An automatic stirring device for use in combination with a receptacle having edges and a bottom which device continuously seeks the bottom of a receptacle on which it is mounted, said stirring device including the combination of a motor positioned in a housing, a sleeve positioned centrally of said motor and being directly driven thereby, means for adjustably supporting said housing upon the edges of said receptacle, a shaft extending through said sleeve and being directly driven thereby, a plurality of stirring blades, a plurality of arms, each one of said arms pivotally interconnecting one of said stirring blades and one end of said shaft whereby said blades hang downwardly when said shaft is stationary and move laterally outwardly in response to the application of pressure or centrifugal force thereto thereby to automatically adapt to the diameter of said receptacle, said shaft being freely and unrestrictedly moveable downwardly through its entire length, whereby said shaft moves downwardly as said blades move laterally.

2. An automatic stirring device for use in combination with a receptacle having edges and a bottom which device continuously seeks the bottom of a receptacle on which it is mounted, said stirring device including the combination of a motor positioned in a housing, a sleeve positioned centrally of said motor and directly driven thereby, means for adjustably supporting said housing upon the edges of said receptacle, a shaft extending through said sleeve and being directly driven thereby, a vertical slot provided in one end of said shaft, a stirrer blade mounted within said vertical slot and laterally slidable therein, said stirrer blade being retained within said vertical slot only by frictional engagement therewith, said shaft being freely and unrestrictedly moveable downwardly through its entire length until said downward movement is halted by contact with the bottom of said receptacle.

3. An automatic stirring device for use in combination with a receptacle having edges and a bottom which device continuously seeks the bottom of a receptacle on which it is mounted, said stirring device including the combination of a motor positioned in a housing, a plurality of arms hingeably secured to said housing and adapted to extend radially therefrom when said stirrer is in operation to thereby support said stirrer upon said receptacle, said arms being retractable circumferentially from said housing when said stirrer is not being used to thereby facilitate storage of said stirrer, a shaft driven by said motor and depending into said receptacle, a stirring blade connected to one end of said shaft and depending into said receptacle to thereby stir the contents thereof as said shaft is turned by said motor, said shaft being freely and unrestrictedly moveable downwardly through its entire length until said downward movement is halted by contact with the bottom of said receptacle.

4. An automatic stirring device for use in combination with a receptacle having edges and a bottom which device continuously seeks the bottom of a receptacle upon which it is mounted, said stirring device including the combination of a motor positioned in a housing, a plurality of arms hingeably secured to said housing and adapted to extend radially therefrom in a plane perpendicular to the longitudinal axis of said motor when said stirrer is in operation to thereby support said stirrer upon said receptacle, said arms being retractable in said plane to thereby nest against said housing and conform to the contour thereof when said stirrer is not being used to thereby facilitate storage of said stirrer, a shaft driven by said motor and depending into said receptacle, a stirring blade affixed to one end of said shaft and extending into said receptacle to thereby stir the contents thereof, said shaft being freely and unrestrictedly moveable downwardly through its entire length until said downward movement is halted by contact with the bottom of said receptacle.

5. An automatic stirring device for use in combination with a receptacle having edges and a bottom which device continuously seeks the bottom of a receptacle upon which it is mounted, said stirring device including the combination of a motor positioned in a housing, a plurality of arms pivotally affixed to said housing and adapted to extend therefrom and engage the edge portions of said receptacle when said stirring device is in use, at least one of said arms having a plurality of notches formed in one edge portion thereof to contact the edge portion of said receptacle and thereby positively lock said housing in position upon receptacles of various sizes, a shaft driven by said motor and depending into said receptacle, a stirring blade affixed to one end of said shaft and extending into said receptacle to thereby stir the contents thereof, said shaft being freely and unrestrictedly moveable downwardly through its entire length until said downward movement is halted by contact with the bottom of said receptacle.

References Cited in the file of this patent

UNITED STATES PATENTS

| 1,201,920 | Beach | Oct. 17, 1916 |
| 1,333,379 | Black | Mar. 9, 1920 |
| 2,023,460 | Beach | Dec. 10, 1935 |
| 2,805,843 | Block | Sept. 10, 1957 |

FOREIGN PATENTS

| 3,207 | Great Britain | Apr. 18, 1907 |
| 234,607 | Great Britain | June 4, 1925 |
| 142,752 | Austria | Sept. 10, 1935 |